United States Patent
Litvin et al.

(10) Patent No.: US 9,521,424 B1
(45) Date of Patent: Dec. 13, 2016

(54) METHOD, APPARATUS, AND MANUFACTURE FOR LOCAL WEIGHTED PREDICTION COEFFICIENTS ESTIMATION FOR VIDEO ENCODING

(75) Inventors: Yevgeni Litvin, Nazarteh Illit (IL); Eran Pinhasov, Zichron Yaakov (IL)

(73) Assignee: Qualcomm Technologies, Inc., San Diego, CA (US)

( * ) Notice: Subject to any disclaimer, the term of this patent is extended or adjusted under 35 U.S.C. 154(b) by 336 days.

(21) Appl. No.: 13/253,840

(22) Filed: Oct. 5, 2011

Related U.S. Application Data

(60) Provisional application No. 61/408,135, filed on Oct. 29, 2010.

(51) Int. Cl.
  *H04B 1/66* (2006.01)
  *H04N 7/12* (2006.01)
  *H04N 11/02* (2006.01)
  *H04N 11/04* (2006.01)
  *H04N 19/51* (2014.01)
  *H04N 19/50* (2014.01)
  *H04N 19/61* (2014.01)

(52) U.S. Cl.
  CPC .............. *H04N 19/51* (2014.11); *H04N 19/50* (2014.11); *H04N 19/61* (2014.11)

(58) Field of Classification Search
  USPC .................................................. 375/240.12
  See application file for complete search history.

(56) References Cited

U.S. PATENT DOCUMENTS

| | | | |
|---|---|---|---|
| 2008/0198927 A1 | 8/2008 | Wu | |
| 2008/0225946 A1* | 9/2008 | Yin et al. | 375/240.12 |
| 2008/0253456 A1* | 10/2008 | Yin et al. | 375/240.16 |
| 2009/0034854 A1* | 2/2009 | Lee et al. | 382/236 |
| 2010/0086027 A1* | 4/2010 | Panchal et al. | 375/240.12 |
| 2010/0086224 A1* | 4/2010 | Demirci et al. | 382/238 |
| 2010/0158110 A1 | 6/2010 | Pandit et al. | |
| 2010/0215095 A1 | 8/2010 | Hayase et al. | |
| 2010/0215100 A1* | 8/2010 | Jeon et al. | 375/240.12 |
| 2010/0232506 A1 | 9/2010 | Yin et al. | |

(Continued)

OTHER PUBLICATIONS

Puri et al. A. Puri, X. Chen and A. Luthra "Video coding using the H.264/MPEG-4 AVC compression standard", Signal Process.: Image Commun., vol. 19, No. 9, pp. 793-849 2004, Published date: Oct. 1, 2004.*

(Continued)

*Primary Examiner* — Christopher S Kelley
*Assistant Examiner* — Ana Picon-Feliciano
(74) *Attorney, Agent, or Firm* — Knobbe, Martens, Olson & Bear, LLP

(57) ABSTRACT

A method, apparatus, and manufacture for encoding a video sequence is provided. Encoding the video sequence includes performing a weighted prediction estimation between a reference frame of the video sequence and a target frame of the video sequence. Performing the weighted prediction includes performing an initial weighted prediction estimation for each block of the reference frame. Next, blocks are clustered according to their initial weighted prediction estimates. Then, each block of the target image is assigned to a corresponding region based on the clustering. During the video encoding, weighted-prediction is employed for each block according to its corresponding region.

22 Claims, 7 Drawing Sheets

(56) References Cited

U.S. PATENT DOCUMENTS

2010/0329334 A1* 12/2010 Kim et al. ............... 375/240.12

OTHER PUBLICATIONS

Kerdprasop et al. Kerdprasop, Kittisak, Nittaya Kerdprasop, and Pairote Sattayatham. "Weighted k-means for density-biased clustering." Data Warehousing and Knowledge Discovery. Springer Berlin Heidelberg, 2005. 488-497, Publication Date: Aug. 15, 2005.*
Wiki. Wikipedia Article on K-means Clustering. Publication date: Jun. 16, 2009. http://web.archive.org/web/20090616141638/http://en.wikipedia.org/wiki/K-means_clustering.*
Boyce, J.M. "Weighted Prediction in the H.264/MPEG AVC Video Coding Standard," Proceedings of the International Symposium on Circuits and Systems ISCAS '04, 3, 2004, III-789-92 http://ieeexplore.ieee.org/xpls/abs_all.jsp?arnumber=1328865.
Kato, H. et al., "Weighting Factor Determination Algorithm for H.264/MPEG-4 AVC Weighted Prediction," Proceedings of the IEEE 6th Workshop on Multimedia Signal Processing, 2004, 27-30 http://ieeexplore.ieee.org/xpis/abs_all.jsp?arnumber=1436407.
Suehring, K., "H.264/AVC Reference Software," Version 16.2, accessed Dec. 5, 2011 http://iphome.hhi.de/suehring/tml.
Bang, H. I. et al., "An Efficient Skipping Method of H.264/AVC Weighted Prediction for Various Illuminating Effects," Circuits and Systems (ISCAS), Proceedings of the 2010 IEEE International Symposium, 2010, pp. 1177-1180.
Yin et al., "Localized Weighted Prediction for Video Coding," Circuits and Systems (ISCAS), IEEE International Symposium, May 23-26, 2005, vol. 5, pp. 4365-4368.

* cited by examiner

METHOD, APPARATUS, AND MANUFACTURE FOR LOCAL WEIGHTED PREDICTION COEFFICIENTS ESTIMATION FOR VIDEO ENCODING

CROSS-REFERENCE TO RELATED APPLICATIONS

This application is a utility patent application based on a previously filed U.S. Provisional Patent Application, Ser. No. 61/408,135 filed on Oct. 29, 2010, the benefit of which is hereby claimed under 35 U.S.C. §119(e) and incorporated herein by reference.

TECHNICAL FIELD

The invention is related to video encoding, and in particular, but not exclusively, to a method, apparatus, and manufacture for assigning accurate weighted prediction coefficients when encoding video in frames in which several light sources or illumination effects are present.

BACKGROUND

Most video coding algorithms, including H.264\AVC video coding standard, use temporal redundancy of images in consequent frames to reduce size of coded bit-stream. In these algorithms, where the Reference frame is a previously coded frame and Target frame is a frame being currently coded, only the residual (i.e. difference) between reference and target frame is typically coded. Often, a video scene contains moving objects, and in order to minimize the residual between target and reference images, a motion estimation (ME) process may be used in order to find better match between target and reference images. This process is typically done at block granularity, yielding a motion vector (MV) per every block of the target image, which describes movement between the target and reference images. These motion-vectors are typically also coded into the bit-stream. Motion compensation (MC) may employ the above motion vectors to create an improved reference image, block by block, by taking parts from the original reference image (sometimes interpolating pixels, in case MVs are in sub-pixel resolution) and creating a motion compensated reference image, such that it will yield smaller residual when subtracting from target image.

Motion estimation algorithms often aim to find a MV that minimizes sum of absolute differences (SAD) or sum of square differences (SSD) between a target block and a reference block. Such algorithms are sensitive to global illumination changes, for example fade-in and fade-out video effects, change of lighting conditions, and/or the like. The H.264\AVC video coding standard offers a weighted prediction (WP) tool that enables the encoder to scale or offset the reference frame, in order to make it similar to the target frame, and by doing this reduce the residual. This process of WP is done by multiplying all of the reference image pixels value by a coefficient and adding an offset (an additive term). The process of weighted prediction coefficients estimation is, in essence, the process of estimating the weight and offset of the reference frame.

BRIEF DESCRIPTION OF THE DRAWINGS

Non-limiting and non-exhaustive embodiments of the present invention are described with reference to the following drawings, in which.

DETAILED DESCRIPTION

Figure 1:
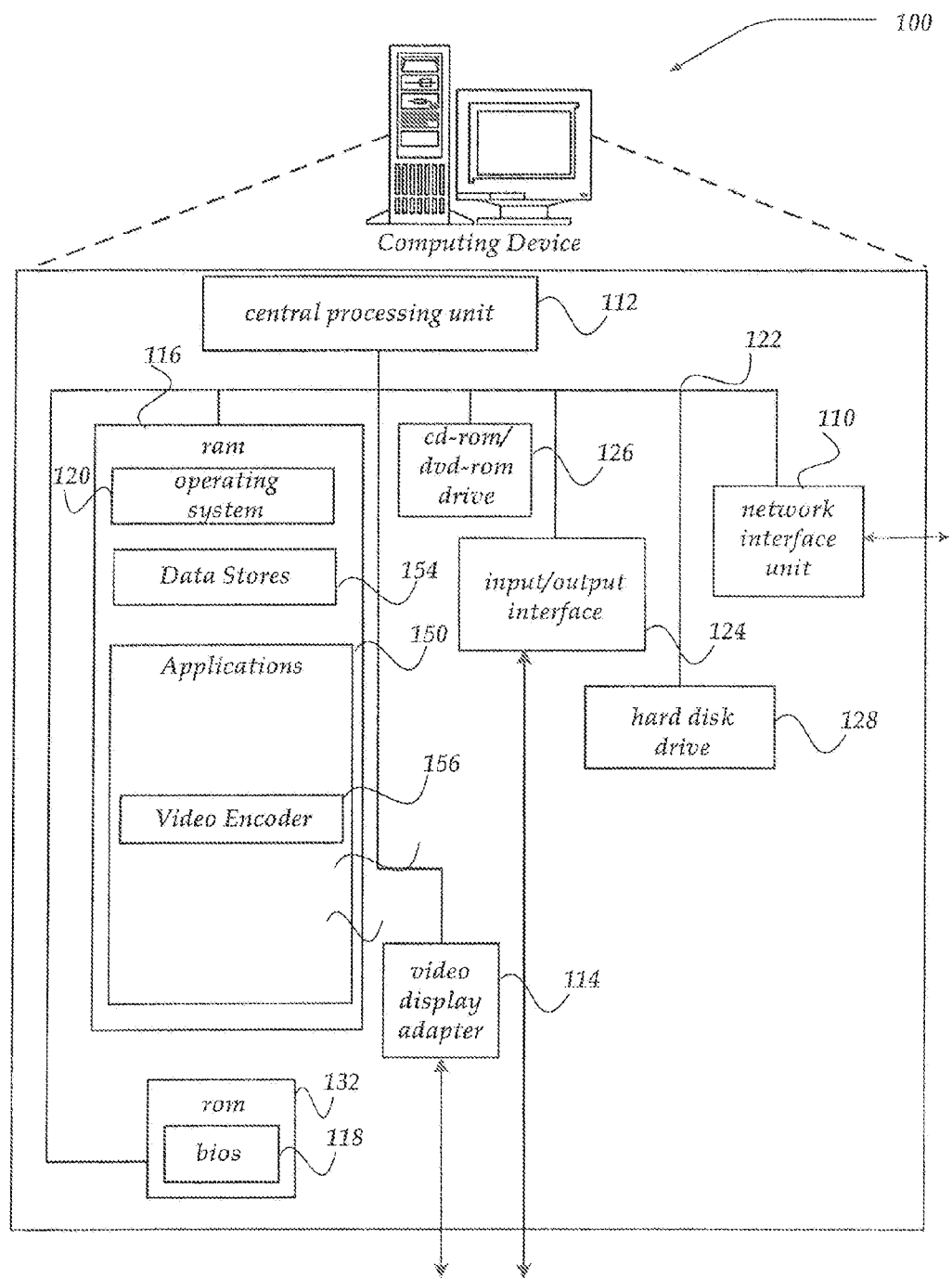
FIG. 1 illustrates a block diagram of an embodiment of a device.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "signal" means at least one current, voltage, charge, temperature, data, or other signal.

Briefly stated, the invention is related to a method, apparatus, and manufacture for encoding a video sequence. Encoding the video sequence includes performing a weighted prediction estimation between a reference frame of the video sequence and a target frame of the video sequence. Performing the weighted prediction includes performing an initial weighted prediction estimation for each block of the reference frame. Next, the initial weighted prediction estimates are clustered. Then, each block of the target image is assigned to a corresponding region based on the clustering.

FIG. 1 shows one embodiment of computing device 100, according to one embodiment of the invention. Computing device 100 may include many more or less components than those shown. The components shown, however, are sufficient to disclose an illustrative embodiment for practicing the invention.

Computing device 100 includes processing unit 112, video display adapter 114, and a mass memory, all in communication with each other via bus 122. The mass memory generally includes RAM 116, ROM 132, and one or more permanent mass storage devices, such as hard disk drive 128, tape drive, optical drive, and/or floppy disk drive. The mass memory stores operating system 120 for controlling the operation of computing device 100. Any general-purpose operating system may be employed. Basic input/output system ("BIOS") 118 is also provided for controlling the low-level operation of computing device 100. Some embodiments of computing device 100 also can communicate with the Internet, or some other communications network, via network interface unit 110, which may be constructed for use with various communication protocols including the TCP/IP protocol. Network interface unit 110 is sometimes known as a transceiver, transceiving device, or network interface card (NIC).

The mass memory as described above illustrates another type of computer-readable/processor-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 154 may include a database, text, spreadsheet, folder, file, or the like, that may be configured to maintain and store user account identifiers, user profiles, email addresses, IM addresses, and/or other network addresses; or the like. Data stores 154 may further include program code, data, algorithms, and the like, for use by a processor, such as central processing unit (CPU) 112 to execute and perform actions. Data stores 154 may include video files, and/or the like. In one embodiment, at least some of data and/or instructions stored in data stores 154 might also be stored on another device of computing device 100, including, but not limited to cd-rom/dvd-rom 126, hard disk drive 128, or other computer-readable storage device resident on computing device 100 or accessible by computing device 100 over, for example, network interface unit 110.

The mass memory also stores program code and data. One or more applications 150 are loaded into mass memory and run on operating system 120. Examples of application programs may include video encoder 156, transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. The data may also include video files and/or the like.

Video encoder application 156 is configured to enable encoding video when executed by CPU 112. While encoding video, video encoder 156 may perform various functions discussed herein and/or discussed with regard to steps as illustrates in the flowcharts shown below. For example, while encoding video, video encoder 156 may perform a weighted prediction estimation between a reference frame of the video sequence and a target frame of the video sequence. This weighted prediction estimation may be performed in accordance in accordance with the process illustrated in FIG. 2 and/or FIG. 4 below. These stored applications, including video encoder 156, are processor-executable code encoded on a processor-readable medium, which, when executed by CPU 112, enable actions to performed in accordance with the processor-executable code.

Figure 2:
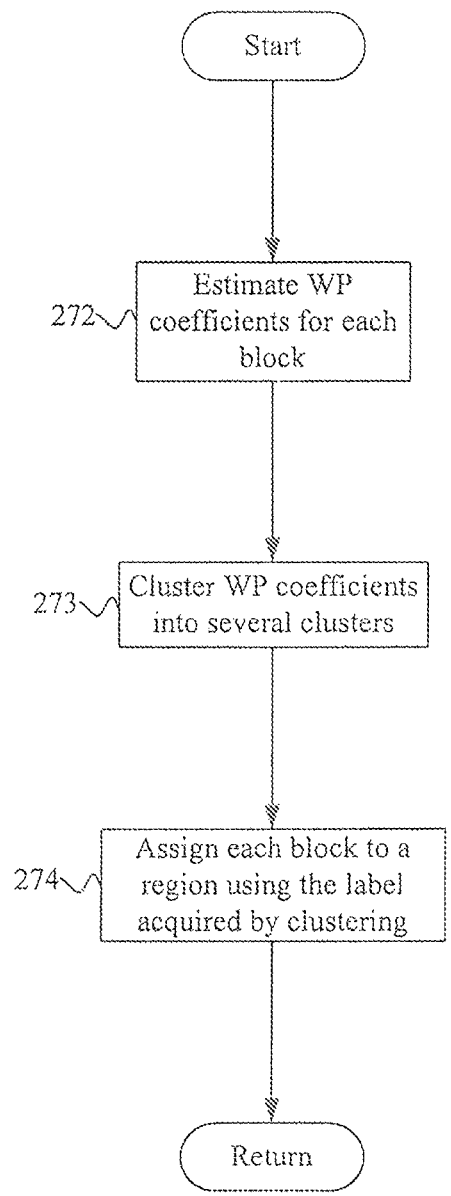
FIG. 2 shows a flowchart of an embodiment of a process that may be employed by an embodiment of the device of FIG. 1.

FIG. 2 shows a flowchart of an embodiment of process 200. Process 200 may be employed by an embodiment of computing device 100 by executing video encoder 156. After a start block, the process proceeds to block 272, where an initial weighted prediction estimation for each block of the reference frame is performed. Next, the process moves to block 273, where the initial weighted prediction estimates are clustered. Then, the process advances to block 274, where each block of the target image is assigned to a corresponding region based on the clustering.

Process 200 may be employed as part of a video coding algorithm. The video coding algorithm may be employed to encode a video sequence. While encoding a video sequence, a weighted prediction estimation may be performed between a reference frame of the video sequence and a target frame of the video sequence. Process 200 may be employed to perform the weighted estimation prediction.

Some embodiments of process 200 employ a H.264/AVC video coding standard, and other embodiments may employ other suitable video coding algorithms. Some embodiments of the video coding standard used in process may use temporal redundancy of images in consequent frames to reduce size of coded bit-stream. In these algorithms, where the Reference frame is a previously coded frame and Target frame is a frame being currently coded, only the residual (i.e. difference) between reference and target frame is typically coded. Often, a video scene contains moving objects, and in order to minimize the residual between target and reference images, a motion estimation (ME) process may be used in order to find better match between target and reference images. This process is typically done at block granularity, yielding a motion vector (MV) per every block of the target image, which describes movement between the target and reference images. These motion-vectors are typically also coded into the bit-stream. Motion compensation (MC) uses the above motion vectors to create an improved reference image, block by block, by taking parts from the original reference image (sometimes interpolating pixels, in case MVs are in sub-pixel resolution) and creating a motion compensated reference image, such that it will yield smaller residual when subtracting from target image. Some embodiments of the motion estimation algorithms aim to find a MV that minimizes sum of absolute differences (SAD) or sum of square differences (SSD) between a target block and a reference block.

Often, different picture regions are illuminated by different light sources (e.g. artificial lighting in room together with outdoors lighting coming through a room window). In other cases, a change in the lighting source has different effect on different objects in a scene due to a different object distance, position, and/or color/reflection-factor. When a light source condition changes, the illumination in the corresponding part of the picture changes as well, but differently on other parts of the scene.

Some embodiments of process 200 modify the H.264/AVC standard so that it is possible to employ many different weighted-prediction settings for a single encoded video frame, thus resolving the problem of local illumination changes, and improving compression. The flexibility of the H.264/AVC standard enables the encoder to use the same reference frame in the reference list with different reference index. Accordingly, as part of process 200, each frame in the reference frame list may be assigned different WP coefficients, even it is the same frame.

The use of process 200 may improve coded video quality in scenes with several changing lighting sources, such as: filming a room with outdoors light coming through a window with indoor lights being turned on or off; filming with a photographic flash occasionally being activated (from some other photographic camera) with different objects located at different distance from the flash; filming at a discotec with multiple and local lighting effects, and/or the like. It also makes it possible to assign more accurate WP coefficients to different picture regions in frames where: several light sources are present, and/or different illumination effect of the same light source on different scene objects due to their distance and the light source properties change in time. It also allows a reduction in the resulting video bit-stream size; for a constant bit-rate video, the video quality is improved.

Prior to discussing explaining how certain particular embodiments process 200 operate in greater detail, it may be of interest to first discuss how an image and/or sequence of images may be received and prepared for processing in one embodiment.

Figure 3:
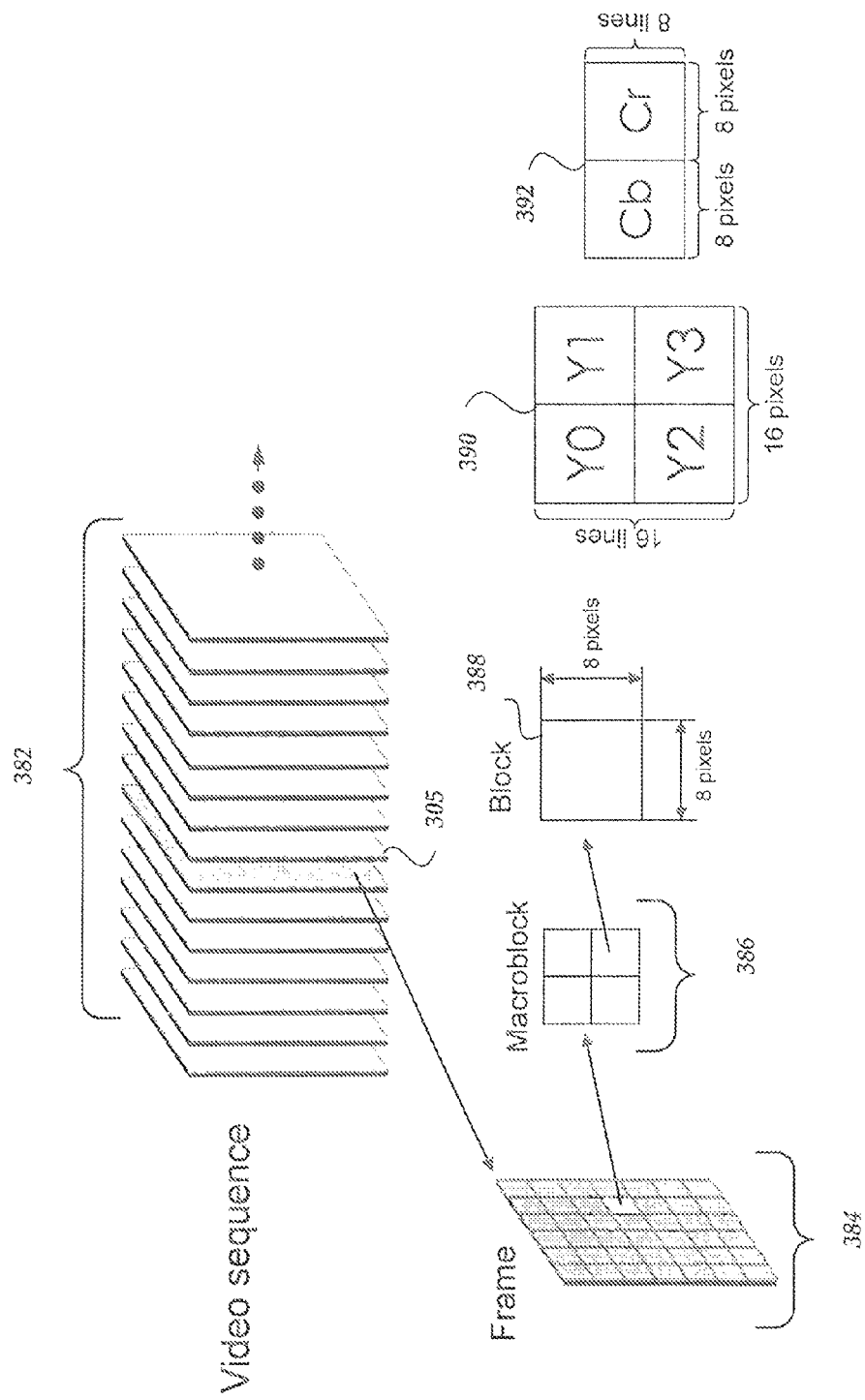
FIG. 3 illustrates a non-limiting, non-exhaustive representation of a video sequence of images.

FIG. 3 illustrates a non-limiting, non-exhaustive representation of a video sequence of images. In one embodiment, the video sequence may include a plurality of frames 382, each frame representing a single capture of a picture or image of some scene. The sequence of images represents 'changes' of the image over time. Thus, for example, frame 384 may represent the image at one time, while frame 385 may represent the image at a second different time, although this is not required.

Frames within the plurality of frames 382 may be coded using any of a variety of mechanisms including those defined by the Joint Video Team (JVT) of the ISO/IEC Moving Picture Expert Group (MPEG) and the ITU-T Video Coding Experts (VCEG). However, it should be understood that embodiments discussed within are not constrained to a particular type of coding mechanism, and any of a variety of other formats, standards, or the like, may also be used. In any event, as shown, frame 384 (or any other frame) may be divided into a set of pixel arrays, such as 16×16 pixels in size, and each pixel array may then be termed a Macro-Block (MB), such as MB 386. It should be recognized that other pixel array sizes may also be employed, including for example, 8×8, 64×64, or even pixel arrays where a number of rows are different from a number of columns within the pixel array. In any event, as is further illustrated in FIG. 3, each MB 386 may be further divided into a plurality of sub-blocks. As shown, one non-limiting example of a sub-block, Block 388, illustrates that MB 386 is divided into four sub-blocks, each of 8×8 pixels. However, other sizes of sub-blocks may also be selected.

In one embodiment, the plurality of frames 382 may be obtained from an analog source, and be represented by red (R), green (G), and blue (B) lines that may be converted into color difference components using, for example, various processes. For example, in one embodiment, such color difference components may be obtained based on the Rec. 601 (formally known as the CCIR-601) component color television standard from the International Telecommunication Union (ITU) Radio communication Sector (ITU-R). However, any of a variety of other techniques may also be employed, and embodiments are not constrained to a particular standard, or format. In any event, by way of example only, the image data may be defined by three components of the image signal; namely, a luminance component (Y), and two complementary chrominance components (V=R−Y) and (U=B−Y). For three dimensional or higher dimensional images, and/or other types of image representations, other components may also be included.

In any event, in this example, each image sub-block (block 388) may be formed of a given number of pixels of the image. A Y block 390, may comprise 16 pixels horizontally and 16 lines of pixels vertically, where the image data includes a color signal, then the image sub-blocks (block 388) further include color information in the form of chrominance components, Cb and Cr, where Cb and Cr are the blue-difference (U) and red-difference (V) components, respectively. Each of the color components may be represented by respectively superimposed color blocks 392.

Various mechanisms may be employed to convert the RGB data signals into color difference components, including for example using a matrix circuit to provide the luminance (Y), and chrominance (Cb, Cr) component signals. In one embodiment, the luminance component and the chrominance components may be received as analog signals that are provided to respective low pass (or equal bandwidth) filters and passed through analog-to-digital converters, to generate a digital data format. In one embodiment, the filtered and digitized luminance and chrominance components may be supplied to a block forming circuit, in one embodiment, where the described image blocks may be formed.

The plurality of frames 382 described above and in FIG. 3 may then be subsequently provided to a video encoder (e.g., video encoder 156 of FIG. 1) to perform video encoding. Herein, the word "picture" is used in some cases rather than frame, since a picture may be a frame (e.g., in the case of progressive video) or a field (e.g., in the case of interlaced video).

Figure 4:
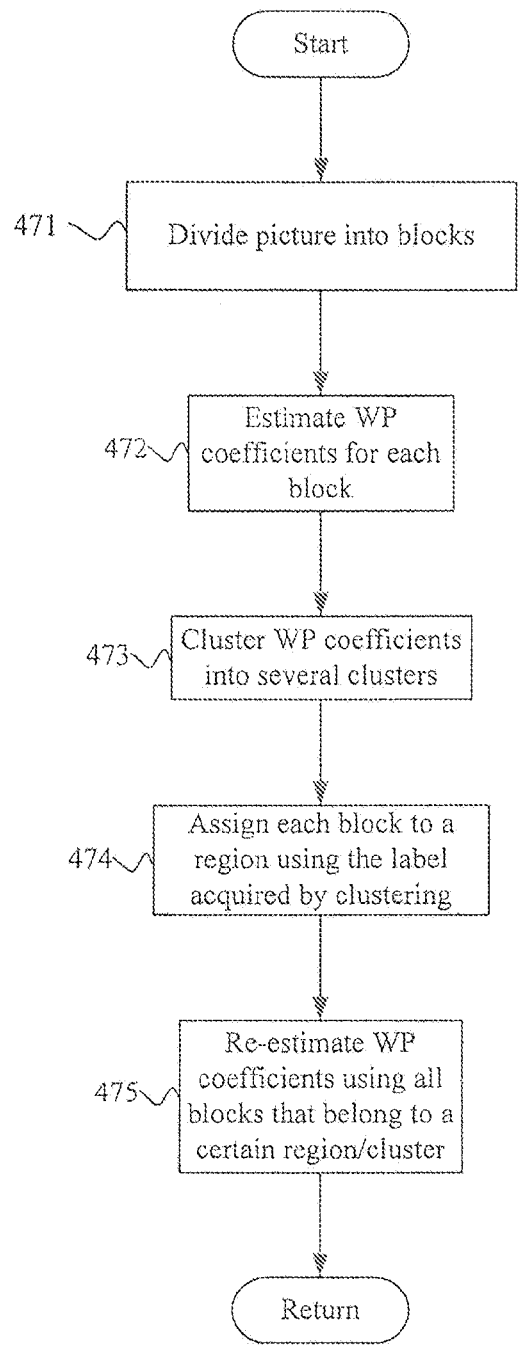
FIG. 4 shows a flowchart of an embodiment of the process of FIG. 2.

FIG. 4 shows a flowchart of an embodiment of process 470, which may be employed as an embodiment of process 270 of FIG. 2. After a start block, the process proceeds to block 471, where the picture is divided into blocks. In some embodiments, after dividing the picture into blocks, each blocks includes at least four macro-blocks. For example, in some embodiments, the picture is divided so that each block consists of three-by-three macro-blocks, so that each block contains 9 macro-blocks. In other embodiments, the picture may be divided so that each block consists of four-by-four macro-blocks, so that each block contains 16 macro-blocks. In other embodiments, other sizes may be used for the blocks. In other various embodiments, a variety of different kinds of blocks may be used. For example, a variety of different block sizes may be employed depending on the desired degree of granularity to be desired in differentiating between various local illumination changes. Also, in some embodiments, blocks may have shapes other than rectangular. For example, in embodiments with a photographic flash, where illumination changes may be may circular or the like, blocks such that are closer to circles in shape, such as hexagonal blocks, may be employed.

There is a trade-off between the size of blocks employed in step 471. If a block is so large than it contains more than one different illumination change within it, the WP coefficients for the block will be bogus results. However, if the blocks are too small, the WP estimations will be noisy and less accurate. Larger blocks improve accuracy of WP coefficients estimation, while smaller blocks improve ability to lock on arbitrary shaped parts of a scene that have a common luminance (chroma) change behavior.

The process then moves to block 472, where WP coefficients for each block are estimated. For example, in some embodiments, for each block in the target frame, a scale and/or an offset is estimated to cause that block in the reference frame to be substantially similar to the corresponding block in the target frame to adjust for differences due to, e.g., illumination change(s) from the target frame to the reference frame. The WP estimation is done for each block in step 472. In some embodiments, the process of step 472 may be substantially the same as WP estimation for an entire frame, except that each block is treated as a "small frame" with a fixed location in both the target and reference frame. In other embodiments, the location is not fixed; for example, in some embodiments, there may be an initial round motion compensation prior to the WP estimation. These embodiments and others are within the scope of the invention.

The blockwise WP estimation in step 472 may suffer from estimation error due to motion, but the noise from this error may be at least partially filtered out by the clustering performed in subsequent steps. In some embodiments, during step 472 each block is given both a multiplicative coefficient (i.e., scale) and an additive coefficient (i.e., offset) with which to make the block in the reference frame substantially similar to the corresponding block in the target frame. In other embodiments, during step 472, a multiplicative coefficient or an additive coefficient is used, but not both. These embodiments and others are within the scope and spirit of the invention.

The process then advances to block 473, where WP coefficients are clustered into several clusters (the number of clusters defining the number of different lighting conditions). Clustering may be accomplished by any suitable method known in the art, including performing a clustering algorithm such as K-means, Random Sample Consensus (RANSAC), spectral clustering, and/or the like.

The process then moves to block 474, where each block is assigned to a region using the label acquired by clustering. The WP coefficients for each block were divided into n clusters in the previous step at block 473. In this step, step 474, the blocks are divided into n regions, each of the n regions corresponding to one of the n clusters, so that for each block, whichever cluster the WP coefficients belong to (as determined in step 473), the block is assigned to the region that corresponds to that cluster. This step basically divides the picture into separate regions, or clusters of blocks, in which the local illumination changes may be different in each region.

The process then proceeds to optional block 475, where WP coefficients are re-estimated using all blocks that belong to a certain region/cluster. In this step, the WP coefficients estimated on a region-by-region basis, rather than a block-by-block basis, employing each block in the region to which the block is assigned for each region. For example, a scale and/or offset may be estimated for each cluster of blocks so that the different cluster of blocks may have different WP coefficients from each other due to different illumination effects at each cluster of blocks. In embodiments in which H.264/AVC is being used, the encoder may use the same reference frame in the reference list with differences references indices. Each frame in the reference frame list may be assigned different WP coefficients, even in the same frame.

Block 475 is an optional block that is skipped in certain embodiment of process 470. For example, in some embodiments, rather than re-estimating the WP coefficients using all blocks that belong to a certain region/cluster, the initial WP coefficients from step 472 are used, but averaged for each block in the cluster. Other embodiments do not skip block 475, and the WP coefficients are re-estimated for each region using all blocks that belong that region.

The process then advances to a return block, where other processing is resumed.

Process 470 may be used for performing a weighted prediction estimation (on a region-by-region basis, where each region is a cluster of blocks) during video encoding. In some embodiments, the weighted estimation prediction is performed to improve the quality of motion estimation that is to be performed subsequent to the weighted estimation prediction. As such, in some embodiments, after process 470 is performed, the video encoding may then proceed by performing motion estimation between the reference frame and the target frame.

Figure 5:
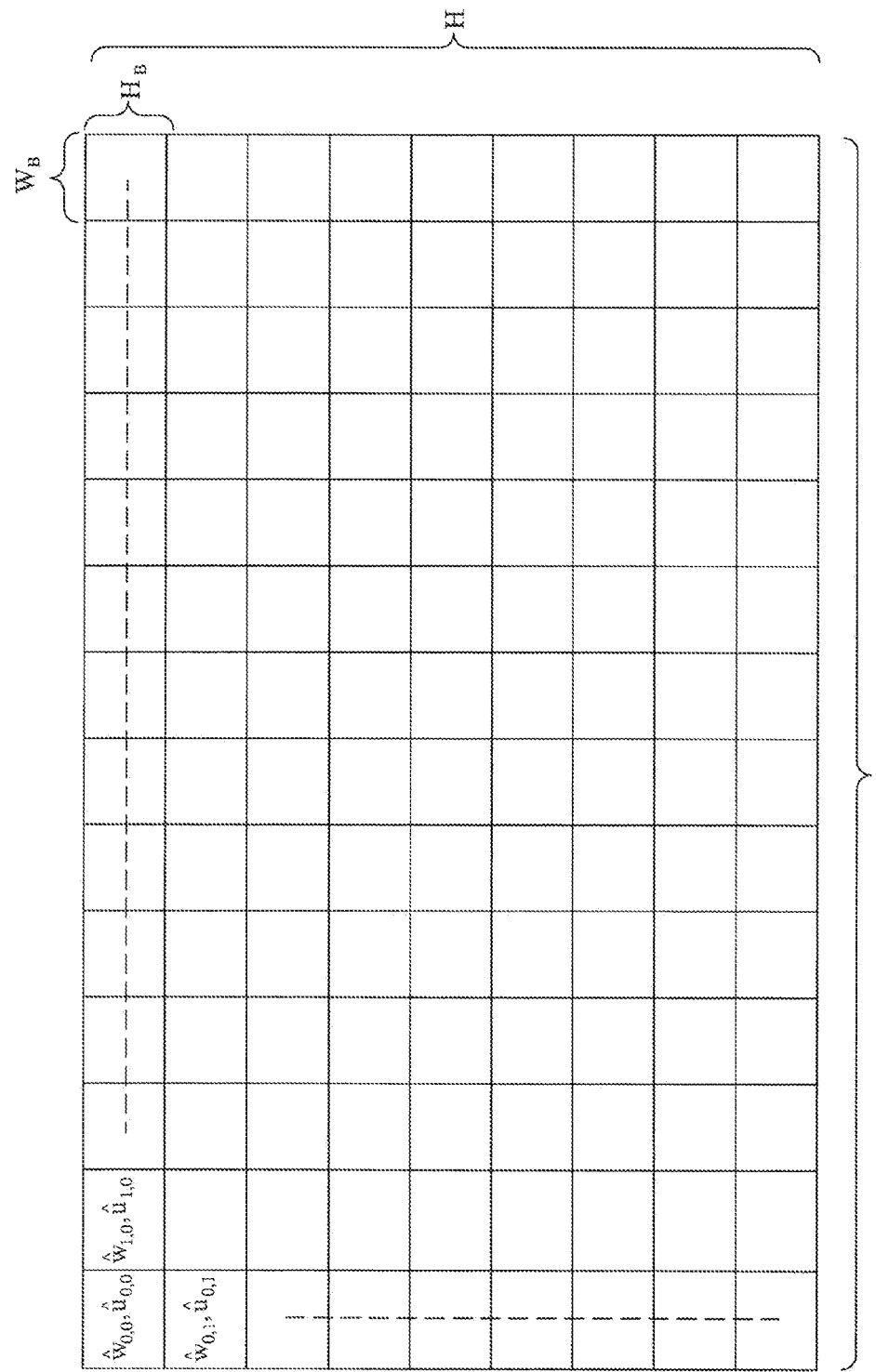
FIG. 5 illustrates an embodiment of division of a reference and target picture into blocks in accordance with a step of an embodiment of the process of FIG. 4.

FIG. 5 illustrates an embodiment of division of a reference and target picture into blocks in accordance step 471 of an embodiment of the process of FIG. 4.

The WP coefficient estimation may be done for luma levels and/or chroma levels in various embodiments, but an embodiment in which the WP estimation is done for luma levels is discussed below.

Let $x_{i,j}$ and $y_{i,j}$ be a reference and a target picture pixels at the i,j coordinates respectively. Let W,H be width and height in pixels of reference and target pictures respectively. Weighted prediction defines following modification rule on a pixel graylevel value using a multiplicative coefficient w, an offset u and the following rule:

$$.x_{i,j} = w_c x_{i,j} + u_c$$

where $C \in \{1, \ldots, K\}$ and K is a number of different WP sets (determined by a number of regions under different lighting change conditions in a picture).

Target and reference pictures are divided into blocks of arbitrary shape. In some embodiments, the blocks are rectangular, but the invention is not so limited. Without loss of generality the following discussion assumes that the blocks are rectangular. Let $W_B, H_B$ be width and height of a block respectively. Let $N_{BW}$ and $N_{BH}$ horizontal and vertical dimension of block cover of the entire picture, i.e. $N_{BW} = \lceil W/W_B \rceil$, $N_{BH} = \lceil H/H_B \rceil$ where $\lceil \cdot \rceil$ is ceiling operator. Let k,□ coordinates of a block, $N_B$ total number of blocks in the picture and $X_{k,l}, Y_{k,l}$ a set of target and reference pixel graylevels located inside a block, i.e.

$$X_{k,l} = \{x_{i,j} | i,j \text{ within block } k, \square\}.$$

Spacial division into blocks is shown in FIG. 5.

Figure 6:
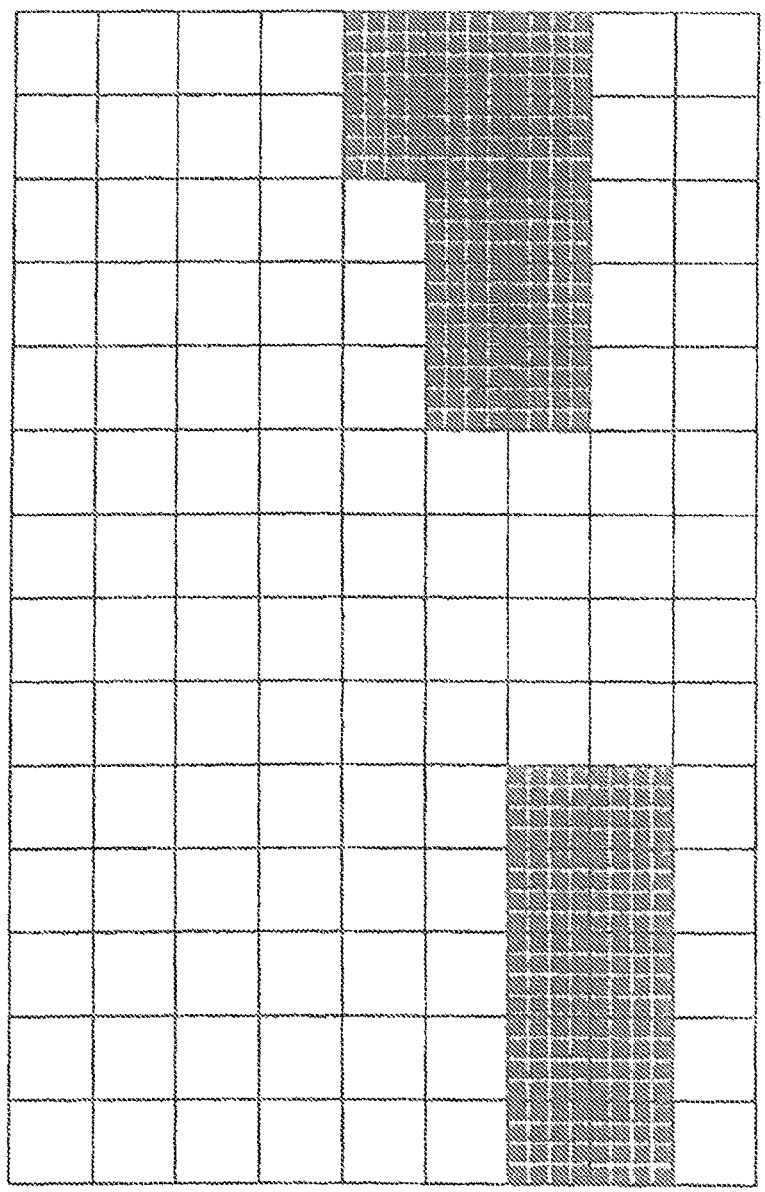
FIG. 6 shows an embodiment of a clustering outcome of a picture for an embodiment of a clustering step for an embodiment of the process of FIG. 4.

FIG. 6 shows an embodiment of a clustering outcome of a picture for an embodiment of step 473 for an embodiment of the process of FIG. 4.

The set of all WP coefficients $\{\hat{w}_{k,\square}, \hat{u}_{k,\square}\}_{k \in \{1, \ldots, N_{BW}\}, \square \in \{1, \ldots, N_{BH}\}}$ is clustered into K clusters (see FIG. 7, as discussed in greater detail below) using, for example, a standard clustering algorithm implemented in a hardware or software unit (e.g., K-means, RUNSAC, spectral clustering and/or any other suitable clustering algorithm). An example block labels assignment is shown in FIG. 6.

Figure 7:
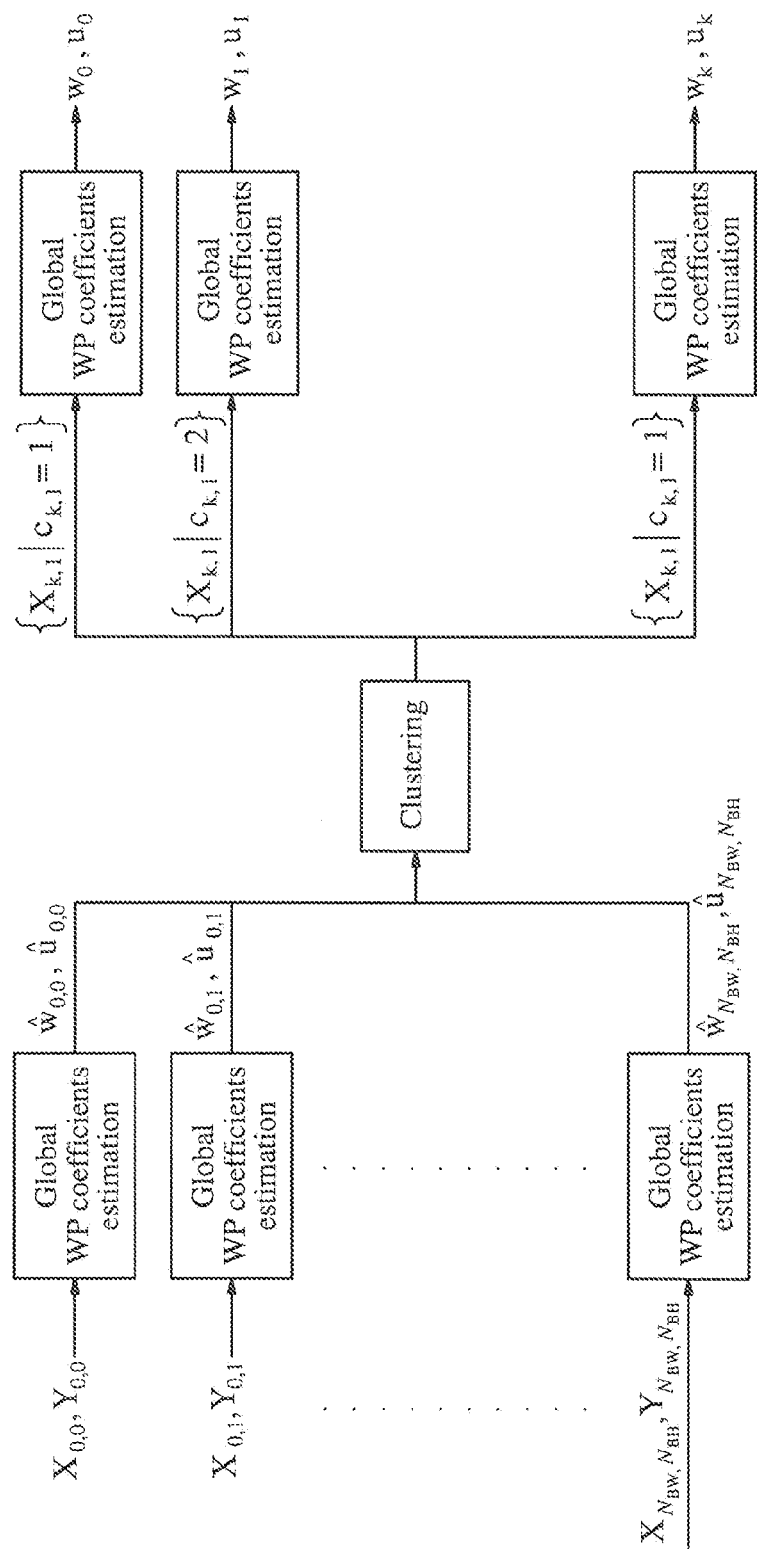
FIG. 7 illustrates a functional block diagram for a portion of an embodiment of the process of FIG. 4, in accordance with aspects of the invention.

FIG. 7 illustrates a functional block diagram for a portion of an embodiment process 470 of FIG. 4.

As shown in FIG. 7, a unit estimates weighted prediction coefficient pair $(\hat{w}_{k,\square}, \hat{u}_{k,\square})$ for k,□-th block. The estimation may be performed using any suitable global WP coefficients estimation algorithm operating only on $X_{k,l}, Y_{k,l}$ pixel values. An example of a standard algorithm performing in one embodiment is minimization of square distance between illumination compensated picture and the target picture.

Let $c_{k,\square} \in \{1, \ldots, K\}$ be index of a cluster that the $\hat{w}_{k,\square}, \hat{u}_{k,\square}$ were assigned to during the clustering.

In some embodiments, coefficients $w_c, u_c$ for cluster c may be estimated using a standard WP coefficient estimation method using pixel graylevels from all blocks assigned to the cluster, i.e. $\{X_{k,\square} | c_{k,\square} = c\}$.

Different WP coefficients may be used in a H.264 or other video coding framework by using K reference list entries that point to the same reference picture but with different weighted prediction coefficients $w_c, u_c$.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method, comprising:
    encoding a video sequence, including:
        performing a weighted prediction estimation between a reference frame of the video sequence and a target frame of the video sequence, the reference frame comprising a plurality of reference frame blocks, the target frame comprising a plurality of target frame blocks, wherein performing the weighted prediction estimation includes:
            determining, for each target frame block of the plurality of target frame blocks, at least one weighted prediction coefficient based on the target frame block and a reference frame block corresponding to the target frame block;
            assigning the weighted prediction coefficients determined for the plurality of target frame blocks to a plurality of clusters, the plurality of clusters comprising a first cluster and a second cluster;
            assigning a first set of target frame blocks in the plurality of target frame blocks to the first cluster based at least in part on the plurality of clusters to which the weighted prediction coefficients are assigned;
            assigning a second set of target frame blocks in the plurality of target frame blocks to the second cluster based at least in part on the plurality of clusters to which the weighted prediction coefficients are assigned;
            dividing the target frame into a plurality of regions based on the corresponding clusters to which the plurality of target frame blocks in the target frame are assigned;
            associating each target frame block in the first set of target frame blocks with a first updated weighted prediction coefficient determined based on the target frame blocks in the first set; and
            associating each target frame block in the second set of target frame blocks with a second updated weighted prediction coefficient determined based on the target frame blocks in the second set, wherein the first updated weighted prediction coefficient has a first value that is different from a second value of the second updated weighted prediction coefficient.

2. The method of claim 1, further comprising:
    determining the first updated weighted prediction coefficient for the first set of target frame blocks such that the determined first updated weighted prediction coefficient adjusts for a first level of difference between the first set of target frame blocks and a corresponding first set of reference frame blocks; and
    determining the second updated weighted prediction coefficient for the second set of target frame blocks such that the determined second updated weighted prediction coefficient adjusts for a second level of difference between the second set of target frame blocks and a corresponding second set of reference frame blocks, wherein the first level of difference is different from the second level of difference.

3. The method of claim 1, wherein the weighted prediction estimation is performed for at least one of luma or chroma.

4. The method of claim 1, wherein determining the at least one weighted prediction coefficient comprises determining at least one of a multiplicative factor and an additive offset that, when applied to the reference frame block, cause the reference frame block to be substantially similar to the target frame block corresponding to the reference frame block.

5. The method of claim 1, wherein determining the at least one weighted prediction coefficient comprises determining a multiplicative factor and an additive offset that, when applied to the reference frame block, cause the reference frame block to be substantially similar to the target frame block corresponding to the reference frame block.

6. The method of claim 1, wherein encoding the video sequence further includes performing motion estimation between the reference frame and the target frame after performing the weighted prediction estimation between the reference frame and the target frame.

7. The method of claim 1, wherein each reference frame block in the plurality of reference frame blocks includes at least four macro-blocks of the reference frame.

8. The method of claim 1, wherein encoding the video sequence is accomplished in accordance with the H.264\AVC video coding standard.

9. The method of claim 8, wherein the same reference frame is included in a reference list multiple times, once for each cluster region, each having a different reference index.

10. The method of claim 1, wherein assigning the weighted prediction coefficients to the plurality of clusters is accomplished with a clustering algorithm.

11. The method of claim 10, wherein the clustering algorithm includes at least one of K-means, random sample consensus, or spectral clustering.

12. An apparatus, comprising:
    a memory that is configured to store processor-executable instructions; and
    a processor that is configured to execute the processor-executable instructions to encode a video sequence via:
        performing a weighted prediction estimation between a reference frame of the video sequence and a target frame of the video sequence, the reference frame comprising a plurality of reference frame blocks, the target frame comprising a plurality of target frame blocks, wherein performing the weighted prediction estimation includes:
            determining, for each target frame block of the plurality of target frame blocks, at least one weighted prediction coefficient based on the target frame block and a reference frame block corresponding to the target frame block;
            assigning the weighted prediction coefficients determined for the plurality of target frame blocks to a plurality of clusters, the plurality of clusters comprising a first cluster and a second cluster;

assigning a first set of target frame blocks in the plurality of target frame blocks to the first cluster based at least in part on the plurality of clusters to which the weighted prediction coefficients are assigned;

assigning a second set of target frame blocks in the plurality of target frame blocks to the second cluster based at least in part on the plurality of clusters to which the weighted prediction coefficients are assigned;

dividing the target frame into a plurality of regions based on the corresponding clusters to which the plurality of target frame blocks in the target frame are assigned;

associating each target frame block in the first set of target frame blocks with a first updated weighted prediction coefficient determined based on the target frame blocks in the first set; and associating each target frame block in the second set of target frame blocks with a second updated weighted prediction coefficient determined based on the target frame blocks in the second set, wherein the first updated weighted prediction coefficient has a first value that is different from a second value of the second updated weighted prediction coefficient.

13. The apparatus of claim 12, wherein the memory and the processor are further configured such that performing the weighted prediction estimation further includes:

determining the first updated weighted prediction coefficient for the first set of target frame blocks such that the determined first updated weighted prediction coefficient adjusts for a first level of difference between the first set of target frame blocks and a corresponding first set of reference frame blocks; and determining the second updated weighted prediction coefficient for the second set of target frame blocks such that the determined second updated weighted prediction coefficient adjusts for a second level of difference between the second set of target frame blocks and a corresponding second set of reference frame blocks, wherein the first level of difference is different from the second level of difference.

14. The apparatus of claim 12, wherein the memory and the processor are further configured such that determining the at least one weighted prediction coefficient comprises determining at least one of a multiplicative factor and an additive offset that, when applied to the reference frame block, cause the reference frame block to be substantially similar to the target frame block corresponding to the reference frame block.

15. The apparatus of claim 12, wherein the memory and the processor are further configured such that assigning the weighted prediction coefficients to the plurality of clusters is accomplished with a clustering algorithm.

16. The apparatus of claim 15, wherein the memory and the processor are further configured such that the clustering algorithm includes at least one of K-means, random sample consensus, or spectral clustering.

17. A manufacture, including a non-transitory processor-readable storage medium having processor-executable code encoded therein, which when executed by one or more processors, encodes a video sequence via:

performing a weighted prediction estimation between a reference frame of the video sequence and a target frame of the video sequence, the reference frame comprising a plurality of reference frame blocks, the target frame comprising a plurality of target frame blocks, wherein performing the weighted prediction estimation includes:

determining, for each target frame block of the plurality of target frame blocks, at least one weighted prediction coefficient based on the target frame block and a reference frame block corresponding to the target frame block;

assigning the weighted prediction coefficients determined for the plurality of target frame blocks to a plurality of clusters, the plurality of clusters comprising a first cluster and a second cluster;

assigning a first set of target frame blocks in the plurality of target frame blocks to the first cluster based at least in part on the plurality of clusters to which the weighted prediction coefficients are assigned;

assigning a second set of target frame blocks in the plurality of target frame blocks to the second cluster based at least in part on the plurality of clusters to which the weighted prediction coefficients are assigned;

dividing the target frame into a plurality of regions based on the corresponding clusters to which the plurality of target frame blocks in the target frame are assigned;

associating each target frame block in the first set of target frame blocks with a first updated weighted prediction coefficient determined based on the target frame blocks in the first set; and associating each target frame block in the second set of target frame blocks with a second updated weighted prediction coefficient determined based on the target frame blocks in the second set, wherein the first updated weighted prediction coefficient has a first value that is different from a second value of the second updated weighted prediction coefficient.

18. The manufacture of claim 17, wherein performing the weighted prediction estimation further includes:

determining the first updated weighted prediction coefficient for the first set of target frame blocks such that the determined first updated weighted prediction coefficient adjusts for a first level of difference between the first set of target frame blocks and a corresponding first set of reference frame blocks; and determining the second updated weighted prediction coefficient for the second set of target frame blocks such that the determined second updated weighted prediction coefficient adjusts for a second level of difference between the second set of target frame blocks and a corresponding second set of reference frame blocks, wherein the first level of difference is different from the second level of difference.

19. The manufacture of claim 17, wherein assigning the weighted prediction coefficients to the plurality of clusters is accomplished with a clustering algorithm.

20. The manufacture of claim 19, wherein the clustering algorithm includes at least one of K-means, random sample consensus, or spectral clustering.

21. The method of claim 2, wherein the first level of difference corresponds to a first local illumination change in the target frame, and the second level of difference corresponds to a second local illumination change in the target frame, wherein the first local illumination change and the second local illumination change affect separate and distinct regions within the target frame.

22. The method of claim 1, further comprising:
determining the first updated weighted prediction coefficient by averaging the weighted prediction coefficients determined for the target frame blocks in the first set; and
determining the second updated weighted prediction coefficient by averaging the weighted prediction coefficients determined for the target frame blocks in the second set.

* * * * *